(12) United States Patent
Ewens et al.

(10) Patent No.: US 9,862,497 B2
(45) Date of Patent: Jan. 9, 2018

(54) ASSEMBLY FOR AN AIRCRAFT, COMPRISING AN ENGINE ATTACHMENT BODY PARTIALLY PRODUCED IN ONE PIECE WITH AN INTERNAL STIFFENING RIB OF AN ATTACHMENT PYLON BOX SECTION

(71) Applicant: Airbus Operations (S.A.S.), Toulouse (FR)

(72) Inventors: David Ewens, Merville (FR); Jonathan Blanc, Blagnac (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/571,772

(22) Filed: Dec. 16, 2014

(65) Prior Publication Data

US 2015/0166192 A1 Jun. 18, 2015

(30) Foreign Application Priority Data

Dec. 17, 2013 (FR) ...................................... 13 62781

(51) Int. Cl.
*B64D 27/26* (2006.01)
*B64D 27/16* (2006.01)
*B64F 5/40* (2017.01)
*B64D 27/18* (2006.01)

(52) U.S. Cl.
CPC ................ *B64D 27/26* (2013.01); *B64F 5/40* (2017.01); *B64D 27/18* (2013.01); *B64D 2027/262* (2013.01); *B64D 2027/264* (2013.01); *B64D 2027/266* (2013.01); *Y10T 29/49815* (2015.01)

(58) Field of Classification Search
CPC .. B64D 27/18; B64D 27/26; B64D 2027/262; B64D 2027/264; B64D 2027/266
See application file for complete search history.

(56) References Cited

U.S. PATENT DOCUMENTS

| | | |
|---|---|---|
| 3,222,017 A | 12/1965 | Bobo |
| 3,357,657 A | 12/1967 | Ferrel |
| 3,779,006 A | 12/1973 | Lewis |
| 3,818,469 A | 6/1974 | Lindberg |
| 4,044,973 A | 8/1977 | Moorehead |

(Continued)

FOREIGN PATENT DOCUMENTS

| | | |
|---|---|---|
| CA | 2801366 A1 | 12/2011 |
| CA | 2839336 A1 | 12/2012 |

(Continued)

OTHER PUBLICATIONS

French Search Report for Application No. FR 1362781 dated Aug. 19, 2014.

(Continued)

*Primary Examiner* — Richard R Green
(74) *Attorney, Agent, or Firm* — Jenkins, Wilson, Taylor & Hunt, P.A.

(57) ABSTRACT

In order to decrease the overall mass of an assembly for an aircraft, including an engine attachment pylon and an engine attachment, the pylon according to the disclosure herein has a primary structure forming a box section equipped with internal transverse stiffening ribs, one of which is produced in one piece with at least a part of the body of the engine attachment.

17 Claims, 5 Drawing Sheets

(56) References Cited

U.S. PATENT DOCUMENTS

| | | |
|---|---|---|
| 4,767,656 A | 8/1988 | Chee |
| 4,801,496 A | 1/1989 | Buchacher |
| 4,821,980 A | 4/1989 | Clausen |
| 5,065,959 A | 11/1991 | Bhatia |
| 5,443,229 A | 8/1995 | O'Brien |
| 5,524,846 A | 6/1996 | Shine |
| 7,448,573 B2 | 11/2008 | Lafont |
| 7,607,609 B2* | 10/2009 | Levert .................. B64D 27/26 244/54 |
| 7,950,604 B2* | 5/2011 | Combes .................. B64D 27/26 244/54 |
| 8,222,165 B2 | 7/2012 | Olver |
| 8,226,029 B2 | 7/2012 | Haramburu |
| 8,251,311 B2 | 8/2012 | Combes |
| 8,336,812 B2 | 12/2012 | Beaufort |
| 8,413,925 B2 | 4/2013 | Martinou |
| 8,789,790 B2* | 7/2014 | Marche .................. B64D 27/26 244/54 |
| 8,864,066 B2* | 10/2014 | Marche .................. B64D 27/26 244/54 |
| 9,067,688 B2 | 6/2015 | Bellabal et al. |
| 2004/0194975 A1 | 10/2004 | Trumper |
| 2005/0151017 A1 | 7/2005 | Noiseux |
| 2005/0178887 A1 | 8/2005 | Beutin |
| 2005/0274485 A1 | 12/2005 | Huggins |
| 2006/0038066 A1 | 2/2006 | Udall |
| 2007/0246603 A1 | 10/2007 | Udall |
| 2008/0105782 A1 | 5/2008 | Beardsley |
| 2008/0272229 A1 | 11/2008 | Lafont et al. |
| 2009/0090811 A1 | 4/2009 | Llamas Sandin |
| 2009/0212155 A1 | 8/2009 | Huggins |
| 2009/0308022 A1 | 12/2009 | Kiskiras |
| 2011/0121132 A1 | 5/2011 | Crook |
| 2011/0284686 A1 | 11/2011 | Caruel |
| 2012/0080555 A1 | 4/2012 | Lafont et al. |
| 2012/0082808 A1 | 4/2012 | Lemains |
| 2012/0104162 A1 | 5/2012 | West |
| 2012/0227370 A1 | 9/2012 | Mickelsen |
| 2013/0232768 A1 | 9/2013 | Suciu |
| 2014/0064950 A1 | 3/2014 | Brochard |
| 2014/0102114 A1 | 4/2014 | Demoulin |
| 2014/0322479 A1 | 10/2014 | Plaindoux |
| 2015/0048202 A1 | 2/2015 | Takeuchi |
| 2015/0175272 A1 | 6/2015 | Brochard et al. |
| 2015/0197341 A1 | 7/2015 | Ewens et al. |
| 2015/0259074 A1 | 9/2015 | Guillemaut et al. |

FOREIGN PATENT DOCUMENTS

| | | |
|---|---|---|
| DE | 29 622 647 U1 | 5/1997 |
| EP | 2332834 A2 | 6/2011 |
| EP | 2436601 A1 | 4/2012 |
| EP | 2631180 A1 | 8/2013 |
| FR | 2127472 A6 | 10/1972 |
| FR | 2891243 A1 | 3/2007 |
| FR | 2891252 A1 | 3/2007 |
| FR | 2915175 A1 | 10/2008 |
| FR | 2917712 A1 | 12/2008 |
| FR | 2935953 A1 | 3/2010 |
| FR | 2942165 | 8/2010 |
| FR | 2946621 A1 | 12/2010 |
| FR | 2950322 A1 | 3/2011 |
| FR | 2970700 A1 | 7/2012 |
| FR | 2976914 A1 | 12/2012 |
| FR | 2994941 A1 | 3/2014 |
| WO | WO-2009/040864 A1 | 4/2009 |
| WO | WO-2010/066985 A1 | 6/2010 |

OTHER PUBLICATIONS

French Search Report for Application No. FR 1362777 dated Aug. 19, 2014.

French Search Report for Application No. FR 1363046 dated Aug. 6, 2014.

French Search Report for Application No. FR 1363451 dated Aug. 18, 2014.

Non-Final Office Action for U.S. Appl. No. 14/571,786 dated Jun. 3, 2016.

Restriction Requirement for U.S. Appl. No. 14/573,447 dated Jun. 14, 2016.

Non-Final Office Action for Application No. 14/573,447 fated Nov. 4, 2016.

Final Office Action for U.S. Appl. No. 14/571,786 dated Jan. 12, 2017.

Restriction Requirement for U.S. Appl. No. 14/557,074 dated Jul. 1, 2016.

Final Office for U.S. Appl. No. 14/133,023 dated Aug. 18, 2016.

Non-Final Office Action for U.S. Appl. No. 14/575,332 dated Sep. 7, 2016.

* cited by examiner

ASSEMBLY FOR AN AIRCRAFT, COMPRISING AN ENGINE ATTACHMENT BODY PARTIALLY PRODUCED IN ONE PIECE WITH AN INTERNAL STIFFENING RIB OF AN ATTACHMENT PYLON BOX SECTION

CROSS-REFERENCE TO RELATED APPLICATION

This application claims the benefit of and priority to French Patent Application No. 13 62781 filed Dec. 17, 2013, the entire disclosure of which is incorporated by reference herein.

TECHNICAL FIELD

The disclosure herein relates to the field of assemblies for aircraft, comprising an attachment pylon for an aircraft engine, and also an engine attachment, preferably a rear engine attachment, that is mounted on the attachment pylon and is intended to provide joining between the engine and this pylon.

The disclosure herein also relates to an aircraft equipped with such an assembly. It applies preferably to commercial airplanes.

BACKGROUND

In existing aircraft, the engines, such as the jet engines, are suspended below the wing by complex attachment devices, also referred to as EMS (Engine Mounting Structures), or attachment pylons. The attachment devices commonly employed have a rigid structure, referred to as the primary structure. This primary structure forms a box section, that is to say it is formed by the assembly of lower and upper spars that are connected together by a plurality of transverse stiffening ribs that are located inside the box section. The spars are arranged in the upper and lower faces, while lateral panels close the lateral faces of the box section.

In a known manner, the primary structure of these pylons is designed to allow the static and dynamic forces brought about by the engines, such as the weight, the thrust, or the various dynamic forces, to be transmitted to the wing.

In solutions known from the prior art, forces are conventionally transmitted between the engine and the primary structure by an attachment consisting of a front engine attachment, a rear engine attachment and a device for taking up thrust forces. A conventional exemplary embodiment of the rear engine attachment is shown in FIG. 1.

This rear engine attachment connects the exhaust casing of the engine to the primary structure of the attachment pylon in the form of a box section. To this end, the attachment comprises a body and a plurality of shackles that are articulated on the engine attachment body and on the exhaust casing. More specifically, the body comprises two stages of beams that are stacked in the vertical direction. These are one or more upper beams that are fixed by bolts to the outer face of the lower spar that closes the box section, and one or more lower beams that are fixed by bolts to the upper beams. It is this lower beam which carries, in an articulated manner, the shackles. More commonly, the upper beams are referred to as "intermediate fittings" while a single lower beam, more commonly referred to as "engine beam", is generally employed. It should be noted that during the removal of the engine, for example in order to carry out maintenance operations, disconnection takes place at the interface referenced, which is located between the upper beams that remain fixed to the box section and the lower beam that remains fixed to the engine via the shackles.

Although this solution proves to be satisfactory in many respects, it can be improved. In particular there is a need to reduce its overall mass.

SUMMARY

The aim of the disclosure herein is thus to propose an assembly for an aircraft that at least partially remedies the abovementioned problems that are encountered in the prior art solutions.

To this end, a subject of the disclosure herein is an assembly for an aircraft, comprising an attachment pylon for an aircraft engine, and also an engine attachment that is mounted on the attachment pylon and to provide a joining between the engine and this pylon, the latter comprising a primary structure forming a box section equipped with internal transverse stiffening ribs, the engine attachment comprising a body located outside the box section, and also shackles that are articulated on the body and can be articulated on the engine.

According to the disclosure herein, at least a part of the body of the engine attachment is produced in one piece with one of the internal transverse stiffening ribs of the box section.

The disclosure herein has the advantage of functionalizing one of the internal ribs of the box section such that it forms a part of the body of the engine attachment, arranged outside this same box section. The introduction of forces into the box section is more direct, and the overall mass of the body of the engine attachment is advantageously reduced by the absence of a mechanical bolted joint between the rib and its extension that forms an integral part of the engine attachment body.

The disclosure herein provides at least one of the following optional features, taken on their own or in combination.

According to a first embodiment, the part of the body of the engine attachment, produced in one piece with one of the internal transverse stiffening ribs, is a central beam located outside the box section. The body additionally comprises, at each of the ends of this central beam in a transverse direction of the assembly, a one-piece fitting comprising a first joining portion on which one of the shackles is intended to be articulated, and also a second joining portion that is fixed to the box section and passes into the latter.

The second joining portion is arranged between a lateral panel of the box section and an internal transverse stiffening rib of the box section.

The first joining portion forms a clevis, and the second joining portion is substantially flat.

The two fittings are fixed to the central beam, on which a shackle can be articulated.

According to a second embodiment of the disclosure herein, the part of the body of the engine attachment, produced in one piece with one of the internal transverse stiffening ribs, is in the form of two extensions of the base of the rib that are located outside the box section, the two extensions being spaced apart from one another in a transverse direction of the assembly, and the body of the engine attachment also comprises a main beam fixed to the two extensions, the shackles being articulated on the main beam of the engine attachment.

Regardless of the embodiment envisaged, provision is preferably made for the assembly also to comprise a device for taking up thrust forces, comprising:

a support element fixed to the box section, outside the latter;

two lateral link rods for taking up thrust forces; and a spreader articulated on the support element, the two lateral link rods being articulated on the two opposite ends of the spreader, respectively.

For the first embodiment, the spreader is also mounted with play, at its two ends, on connecting members that form an integral part of the central beam, the support element of the device for taking up thrust forces being preferably arranged in a recess made in the central beam. Alternatively, the device for taking up thrust forces could be connected to the rigid structure that forms a box section elsewhere and not in the region of the abovementioned engine attachment.

For the second embodiment, the spreader is also mounted with play, at its two ends, on connecting members that form an integral part of the main beam, the support element of the device for taking up thrust forces being preferably arranged between the two extensions of the base of the rib.

In both cases this configuration makes it possible to ensure the continuity of the take-up of thrust forces in the event of one of the two lateral link rods failing.

The engine attachment is a rear engine attachment, and the assembly additionally comprises a front engine attachment.

The rear engine attachment, the front engine attachment and the device for taking up thrust forces together form structure for attaching the engine that form an isostatic system for taking up forces.

The engine attachment defines two lateral half-attachments, wherein the first half-attachment is designed to only take up thrust forces that are oriented in a vertical direction of the assembly, and wherein the second half-attachment is designed to only take up thrust forces that are oriented in the vertical direction and in a transverse direction of the assembly. Alternatively, forces in the transverse direction can also be taken up at the centre of the engine attachment. In this scenario, the second half-attachment could ensure such a take-up only if the central part of the engine attachment fails, so as to provide what is referred to as a failsafe function. A further subject of the disclosure herein is an aircraft part comprising an assembly as described above, a wing element from which the pylon is suspended, and an engine fixed to the engine attachment.

A further subject of the disclosure herein is an aircraft comprising at least one such assembly.

Finally, a subject of the disclosure herein is a method for removing an engine fixed by the engine attachment of an assembly as described above, this method comprising the removal of each of the shackles at at least one of the two ends thereof.

Further advantages and features of the disclosure herein will become apparent from the nonlimiting detailed description below.

BRIEF DESCRIPTION OF THE DRAWINGS

This description will be given with regard to the appended drawings, in which.

DETAILED DESCRIPTION

Figure 2:
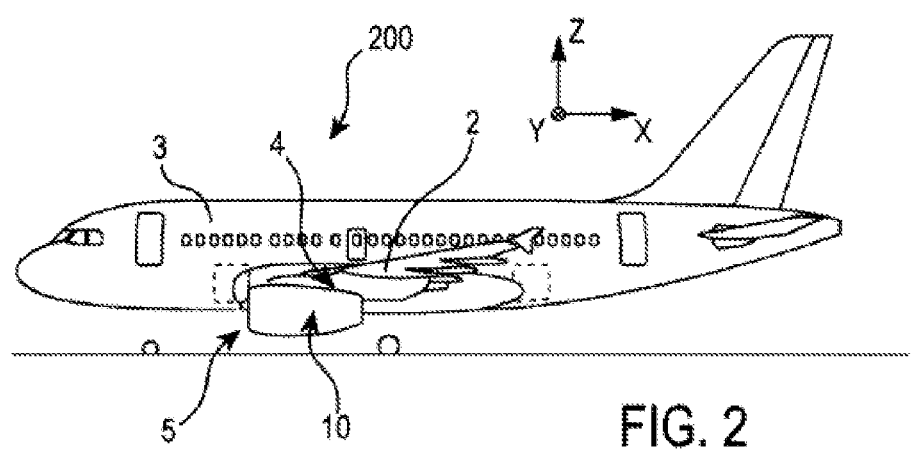
FIG. 2 shows an aircraft equipped with an assembly according to the disclosure herein.

With reference to FIG. 2, an aircraft 200 is shown comprising a fuselage 3 to which a part 5 according to the disclosure herein is fixed. This part 5 comprises a wing element 2 corresponding to a wing of the aircraft, a bypass engine 10 such as a jet engine, and an attachment pylon 4 for the engine 10. Preferably, two parts 5 are arranged respectively on either side of the fuselage 3.

Figure 3:
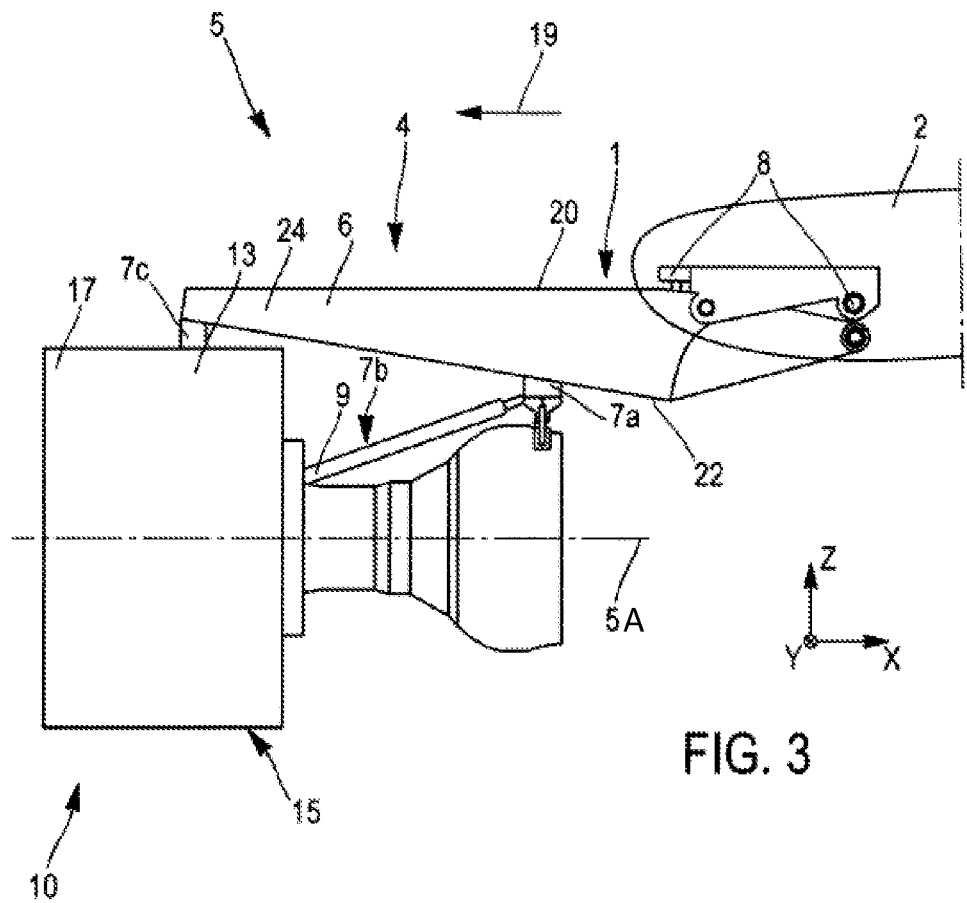
FIG. 3 shows a schematic side view of the assembly shown in the preceding figure, according to a first embodiment of the disclosure herein.

With reference to FIG. 3, one of the parts 5 is shown in more detail. The figure shows the wing element 2, the jet engine 10 and the attachment pylon 4. In addition, provision is made of attachment 8 for attaching the pylon 4 to the wing element 2, and also attachment 7a, 7b, 7c for attaching the jet engine 10 to the pylon. The attachments 7a-7c and the pylon 4 form an assembly 1 according to an embodiment of the disclosure herein.

It should be noted that the attachment 8, located at the interface between the pylon 4 and the wing element 2, are produced in a conventional manner. Therefore, they will not be described further.

As far as the attachment 7a-7c is concerned, these comprise a rear engine attachment 7a, a device 7b for taking up thrust forces, and a front engine attachment 7c. In this respect, it is noted that the front end of the rigid structure 6 of the pylon, also referred to as the primary structure, is fixed, via the front engine attachment 7c, to an external shroud 13 of an intermediate casing 15 of the jet engine 10. This shroud 13 extends, toward the rear, in axial extension of a fan casing 17, substantially with the same diameter. Alternatively, the front engine attachment 7c could be joined to the fan casing 17.

Throughout the following description, by convention, the direction X corresponds to the longitudinal direction of the pylon 4, which can also be considered the same as the longitudinal direction of the jet engine 10 and the assembly 1. This direction X is parallel to a longitudinal axis 5A of this jet engine 10. On the other hand, the direction Y corresponds to the direction oriented transversely with respect to the pylon 4 and can also be considered the same as the transverse direction of the jet engine 10 and of the assembly 1, while the direction Z corresponds to the vertical direction or the height. These three directions X, Y and Z are orthogonal to one another and form a direct trihedron.

Furthermore, the terms "front" and "rear" should be considered with respect to a direction of forward movement of the aircraft which is a consequence of the thrust produced by the jet engines 10, this direction being represented schematically by the arrow 19.

Still with reference to FIG. 3, it should be noted that only the primary structure 6 of the attachment pylon 4 has been shown. The other constituent elements, which are not shown, of this pylon 4, of the type of secondary structures for separating and holding the systems while supporting aerodynamic cowlings, are conventional elements that are identical or similar to those known from the prior art. Therefore, they will not be described in detail.

The primary structure 6 comprises essentially a "box section", that is formed by the assembly of upper 20 and lower 22 spars and two lateral panels 24 (only one being visible on account of the side view), these elements 20, 22, 24 being joined together by way of internal transverse stiffening ribs (not shown in FIG. 3) which are usually oriented in parallel planes YZ. These ribs are preferably distributed regularly in the box section 6, in the direction X.

Returning to the attachment 7a-7c, it is noted that the device 7b for taking up thrust forces is also produced in a conventional manner, with the aid of two lateral link rods 9 for taking up forces in the direction X. These link rods 9 are arranged symmetrically with respect to a median plane XZ of the part 5. They are articulated at their front end on an internal shroud of the intermediate casing 15, and are articulated at their rear end on a spreader in the region of the rear engine attachment 7a, as will be described below. Furthermore, this rear engine attachment 7a is specific to the disclosure herein and will be described hereinafter.

Figure 4:
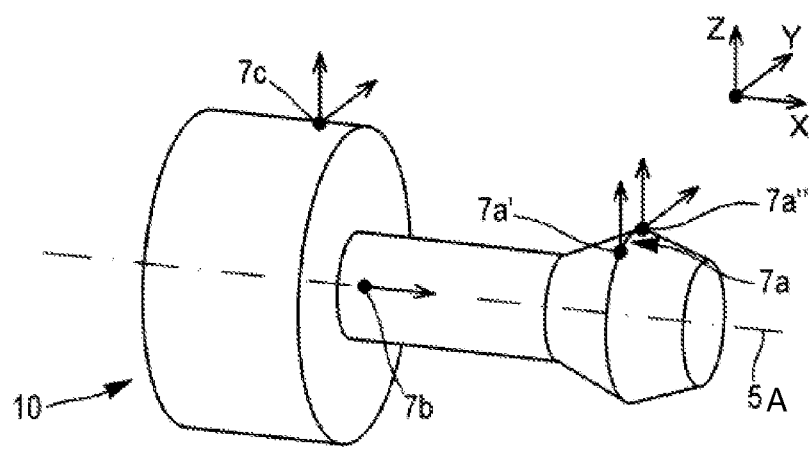
FIG. 4 shows a schematic perspective view showing the take-up of forces by the structure for attaching the engine to the pylon.
Figure 6:
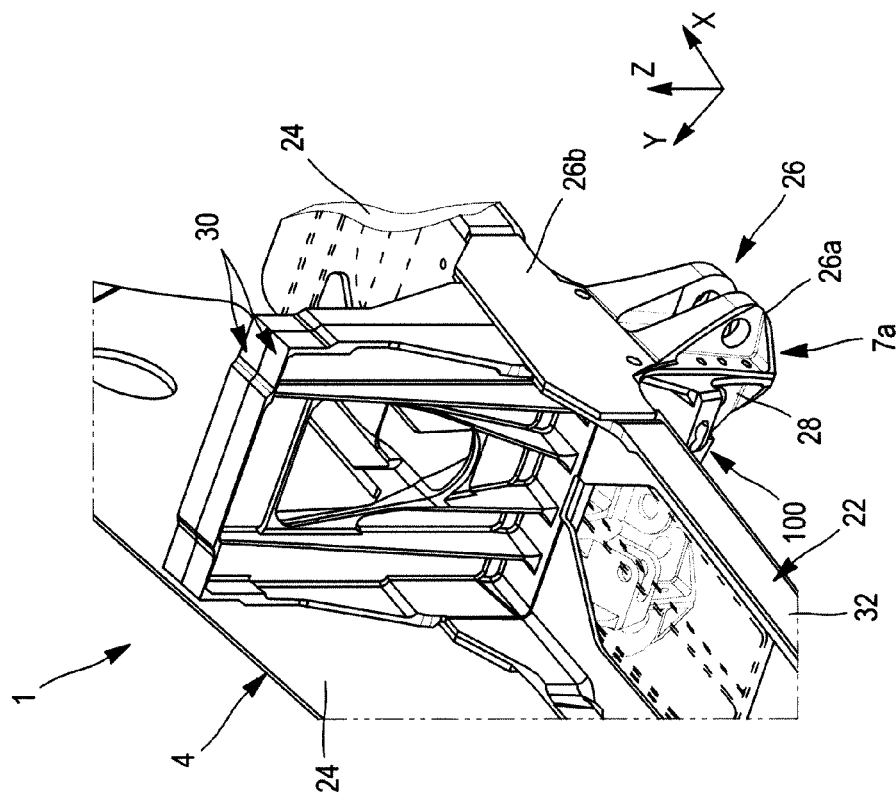
FIG. 6 is a perspective view similar to the one in FIG. 5, from a different angle, in which some of the elements have been removed for reasons of clarity.
Figure 5:
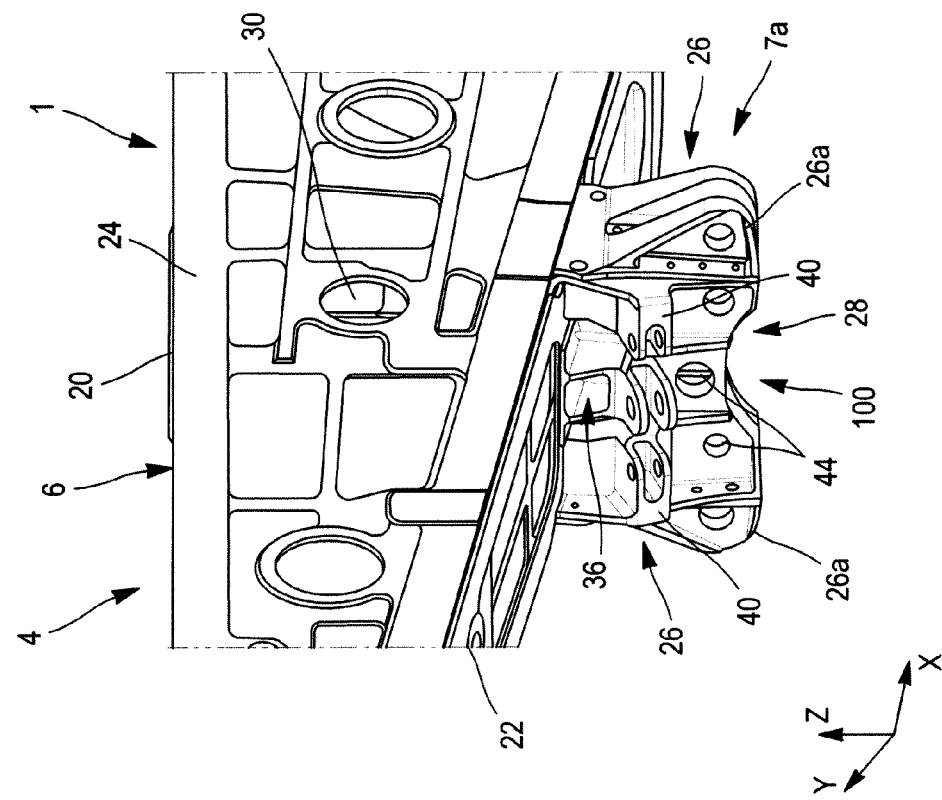
FIG. 5 shows a more detailed perspective view of a part of the assembly for an aircraft that is shown in FIG. 3.
Figure 7:
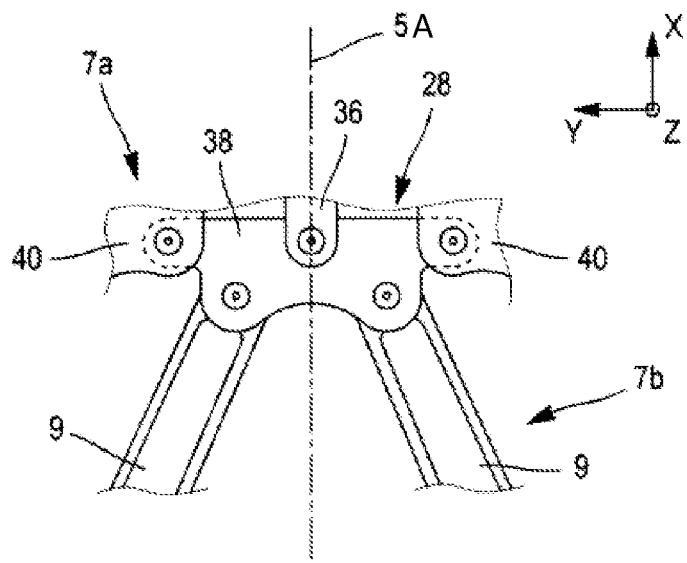
FIG. 7 shows a top view of a part of the structure for attaching the engine to the pylon.
Figure 8:
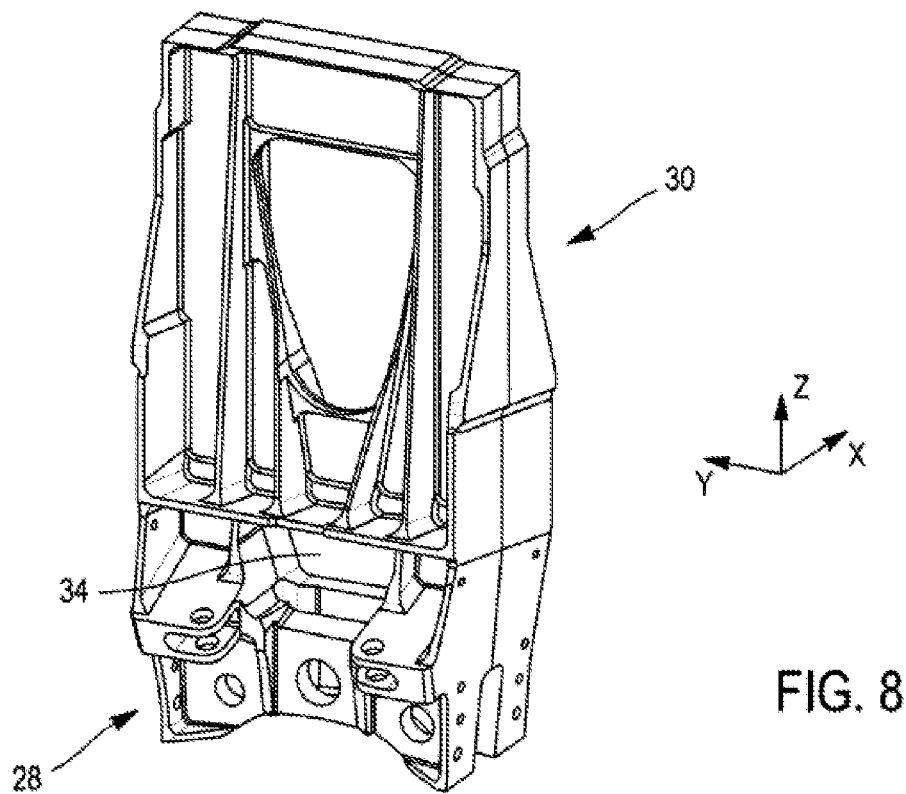
FIG. 8 is a perspective view of an internal transverse stiffening rib of the pylon box section.

The attachment 7a-7c forms an isostatic system for taking up forces. Specifically, as is shown schematically in FIG. 4, the front engine attachment 7c only takes up forces in the directions Y and Z, while the device 7b only takes up forces in the direction X. For its part, the rear engine attachment 7a defines two lateral half-attachments that are arranged on either side of the median vertical plane XZ. The first half-attachment 7a' is designed to only take up thrust forces that are oriented in the direction Z, and the second half-attachment 7a" is designed to only take up thrust forces that are oriented in the directions Y and Z. Depending on the configuration, forces can also be taken up in the direction Y at the centre of the engine beam, and would thus be taken up by the second half-attachment only in the case of failure.

In addition, forces that are exerted in the direction X are taken up with the aid of the device 7b, forces that are exerted in the direction Y are taken up with the aid of the front engine attachment 7c and the half-attachment 7a", while forces that are exerted in the direction Z are taken up jointly with the aid of the front engine attachment 7c and the two rear half-attachments 7a', 7a".

Furthermore, the moment that is exerted in the direction X is taken up vertically with the aid of the two rear half-attachments 7a', 7a", the moment that is exerted in the direction Y is taken up vertically with the aid of these two half-attachments jointly with the front engine attachment 7c, and the moment that is exerted in the direction Z is taken up transversely with the aid of the half-attachment 7a" jointly with the front engine attachment 7c.

With reference now in particular to FIGS. 5 to 9, the rear engine attachment 7a carried by the pylon 4 will be described. The rear engine attachment 7a comprises a body 100 which is segmented transversely into three separate parts that are fixed together by bolts that are preferably oriented in this same direction Y. More specifically, the body 100 comprises, at each of its two ends, a fitting 26 and also a central beam 28 interposed between the two fittings 26 and fixed thereto by transverse bolts.

Each fitting 26 is produced in one piece and comprises a first joining portion 26a in the form of a clevis and a second, substantially planar joining portion 26b that is fixed to the box section 6 and passes into the latter. These two portions 26a, 26b are located one above the other, one in the box section and the other under this same box section.

The joining portion 26a in the form of a clevis allows the articulation of a shackle 102, the other end of which is articulated on the exhaust casing of the jet engine 10. Furthermore, the joining portion 26b is enclosed between the lateral panel 24 and a lateral edge of one of the internal transverse stiffening ribs 30, shown in FIGS. 6 and 8. Transverse bolts pass through and thus clamp the lateral panel 24, the joining portion 26b and the lateral edge of the rib 30. Optionally, connecting angle bars 32 can be interposed between the lateral edge of the rib 30 and the joining portion 26b of the fitting 26.

The two lateral fittings 26 respectively form the core of the two rear engine half-attachments 7a' and 7a". They are thus greatly involved in optimizing the loading of the box section 6 by directly loading the lateral panels 24 and the internal rib 30. Specifically, this design has the advantage of allowing forces to be introduced into another region of the box section than the region of its lower spar 22. The latter is thus less loaded than in the prior art solutions, and the forces are distributed better in the box section 6. In addition, by providing a one-piece fitting 26, the forces can travel more directly between the jet engine 10 and the box section, this advantage furthermore being accompanied by a saving of mass that results from the elimination of the bolts at the interfaces.

Figure 9:
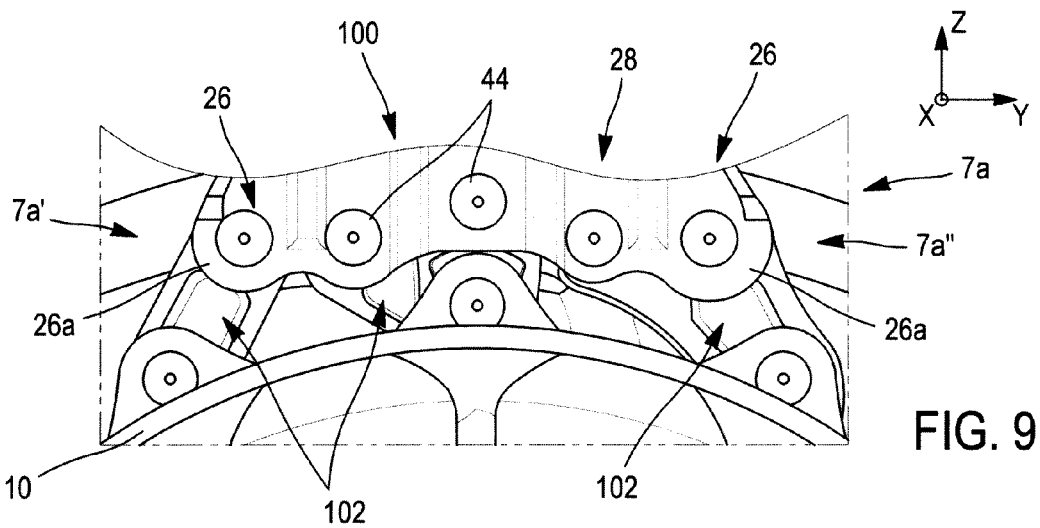
FIG. 9 is a rear view of the rear engine attachment connecting the engine to the pylons.

The lower spar of the box section 6 is also stressed by the central beam 28 which is arranged outside the box section and which also carries a shackle 102 in an articulated manner, as is visible in FIG. 9. This same figure also shows the two shackles 102 associated with the half-attachments 7a' and 7a". For the half-attachment 7a' on the left-hand side of the figure, the shackle 102 is in the form of a link rod that is inclined little with respect to the vertical, whereas for the half-attachment 7a" on the right-hand side of the figure, the shackle 102 has a substantially triangular shape so as to allow the take-up of forces in the direction Y. This triangular shackle 102 can furthermore be articulated at a point in the region of the clevis 26a of the fitting 26 and articulated at a second point on the beam 28, which may be "on standby" depending on the configuration, so as to fulfil a failsafe function. The articulation of the third point then takes place on the exhaust casing of the jet engine.

The segmentation of the body 100 in the direction Y also makes it possible to provide a number of force paths, this being particularly advantageous in the case of failure of one of the parts of this body. In addition, each of these parts 26, 28 extends in one piece under the lower spar of the box section, that is to say they are not segmented in the direction Z, thereby ensuring a cleaner and more direct transfer of the forces into the box section 6. The segmentation of the body 100 in the vertical direction, observed in the prior art, has thus been eliminated in this first embodiment. Here, in order to further improve the transfer of forces into the box section, the central beam 28 of the body 100 is produced in one piece with the rib 30. The part forming the internal rib 30 and the central beam 28 thus crosses the lower spar of the box section 6.

In order to remove the jet engine 10, the body 100 is not removed, but rather the shackles 102 in the region of their top end and/or their bottom end, with the aid of appropriate tools for disassembling the articulated connections. During such a removal of the jet engine, the rear engine attachment 7a is then partially removed, for example in the manner shown in FIG. 5, by removing its shackles.

In other words, the removal is carried out here by disassembling the interface between the shackles 102 and the attachment body 100, and/or by disassembling the interface between these shackles and the jet engine. This has the advantage of limiting the impacts that are repeatedly encountered with the solutions of the prior art, and which required the removal and refitting of numerous tension bolts between the staged beams of the body of the engine attachment. In the prior art, these maintenance operations effectively had the consequence of causing repeated impacts on account of the use of wrenches, which could result in non-negligible damage. In this case, the removal of the shackles 102 can, by contrast, be carried out with the aid of other types of tool, in an environment less dense than that of the staged beams and which is thus less subject to repeated impacts.

For complete removal of the jet engine, work is also carried out in the region of the front engine attachment and in the region of the device for taking up thrust forces, which cooperates closely with the rear engine attachment 7a. Specifically, the central beam 28 comprises a recess 34 in which a support element 36, fixed by vertical bolts at the lower edge of the rib 30, and/or at the lower spar of the box section, is housed. This element 36 allows the articulation of a spreader 38 shown in FIG. 7, at the ends of which the lateral link rods 9 for taking up thrust forces are articulated. The spreader 38, which is articulated at its centre on the support element 36, thus has its lateral ends articulated on each of the rear ends of the two link rods 9. These lateral ends are also articulated, with play, on the connecting members 40 that are an integral part of the central beam 28. These connecting members 40 are preferably in the form of clevises. The play retained in the region of these articulations allows them to be rendered inactive under normal flight conditions, that is to say that the forces do not travel through these articulations and through the clevises 40. On the other hand, in the event of a failure of one of the two link rods, the spreader 38 remains articulated at its centre on the support element 36 and also at the end of the other link rod 9 and on the clevis 40 associated with the faulty link rod. This design makes it possible to fulfil a safety function referred to as a failsafe function. Such a failsafe function can also be associated with the central shackle 102 which is articulated with play in the dedicated orifices 44 of the central beam 28.

Figure 10:
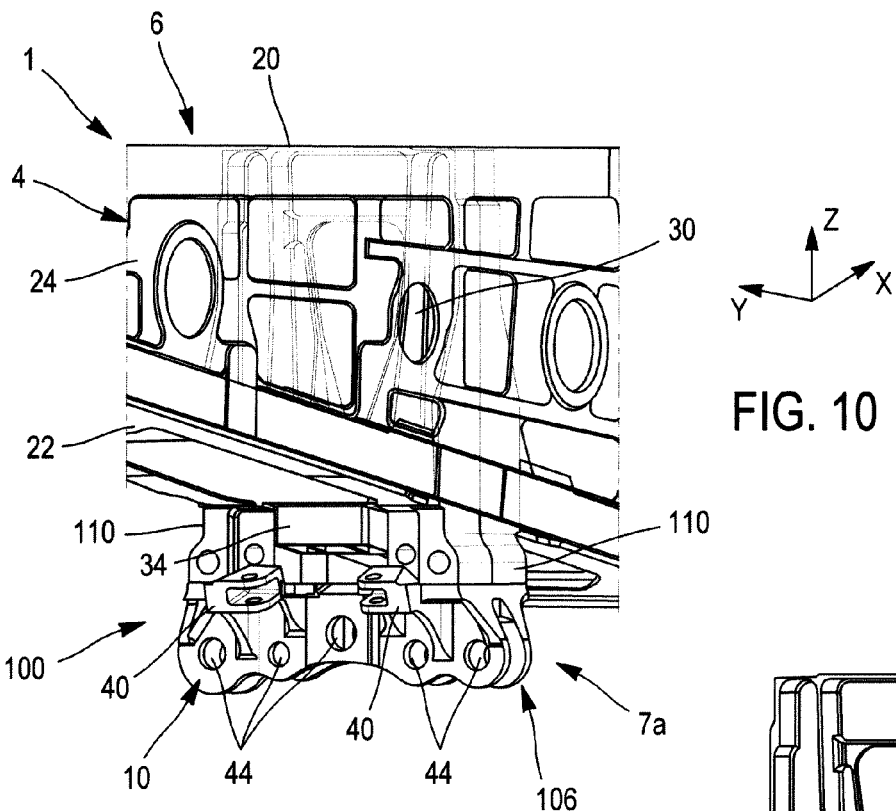
FIG. 10 is a perspective view similar to the one in FIG. 5, with the assembly for an aircraft being in the form of a second embodiment.
Figure 11:
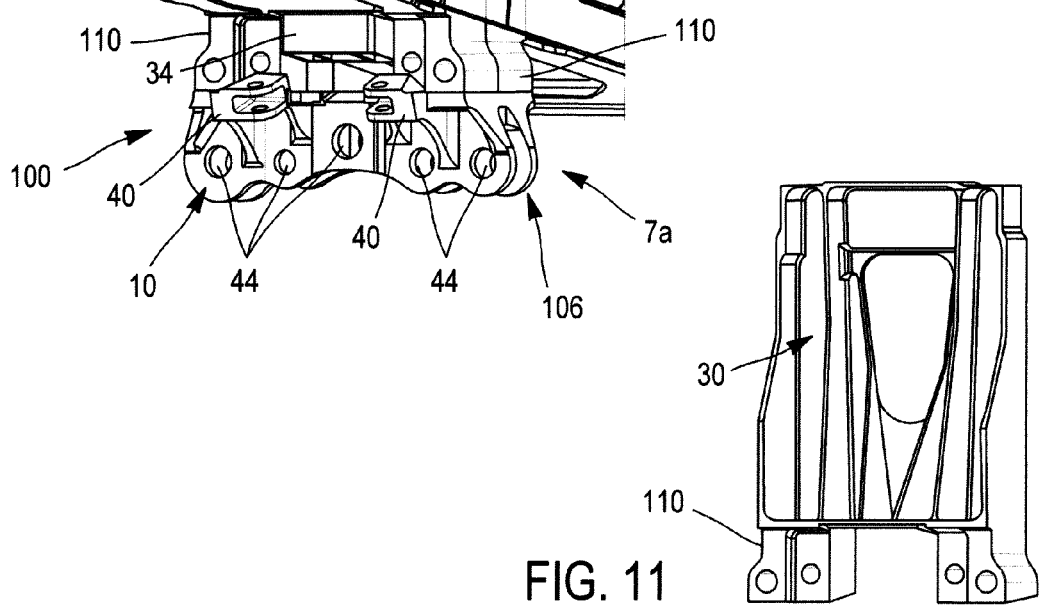
FIG. 11 is a perspective view of an internal transverse stiffening rib of the pylon box section, employed in the second embodiment.

FIGS. 10 and 11 show an assembly 1 according to a second embodiment of the disclosure herein. The design is similar to that of the first embodiment, and so the elements bearing the same reference numerals correspond to identical or similar elements.

In this second embodiment, the rib 30 no longer incorporates the central beam of the attachment body 100 as in the previous embodiment, but incorporates two extensions 110 of the base of the rib that are located outside the box section and are spaced apart from one another in a direction Y. These two extensions 110, which thus project from the lower spar 22 to the outside of the box section, are arranged at the lateral ends of the body 100. As for the previous embodiment, this configuration allows a more direct introduction of the forces into the box section, and also a saving of mass by virtue of the elimination of mechanical connection of the bolt type. The recess 34 is intended to receive the support element (not shown) of the spreader of the device for taking up thrust forces is provided between the two extensions 110, under the lower spar 22.

Figure 1:
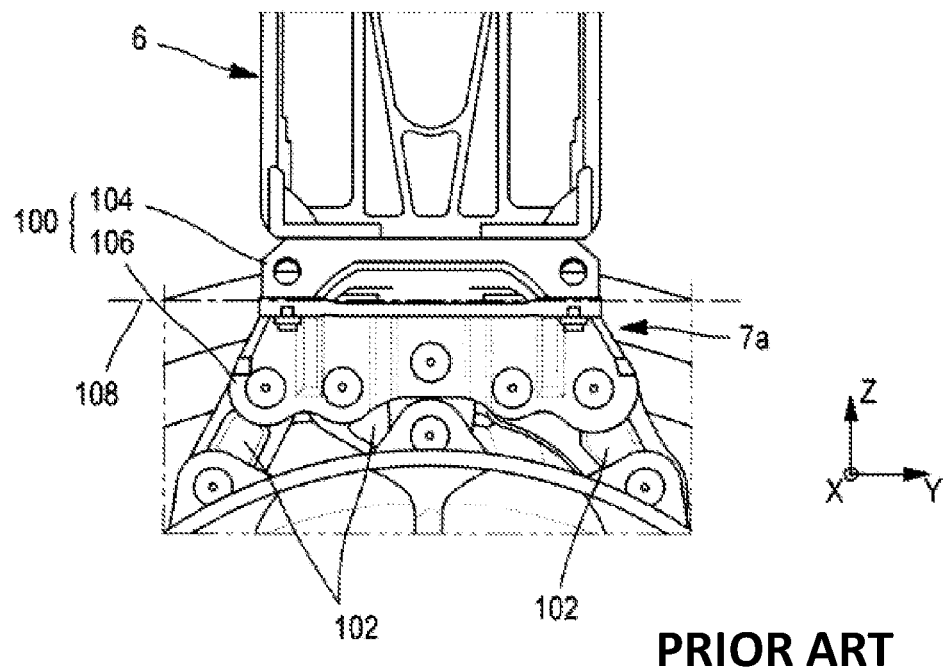
FIG. 1, already described, shows an assembly for an aircraft according to the prior art, comprising an attachment pylon and a rear engine attachment.

Under the two extensions of the base of the rib 110, the body 100 of the engine attachment 7a furthermore comprises a main beam 106 that can be considered the same as the "engine beam" of the assembly in FIG. 1. The main beam 106 is fixed by vertical bolts to the two extensions 110 and extends in one piece along the entire body 100 in the direction Y. Also, on account of the staged design of this second embodiment, this could be compared to the assembly in FIG. 1, the upper beams 104 being replaced here by the two extensions 110 that are produced in one piece with the rib 30.

It is the beam 106 which has the orifices 44 for the articulation of all of the shackles 102 (not shown) of the rear engine attachment 7a, these shackles being arranged in a manner identical or similar to the one described in the context of the first embodiment.

In this second embodiment, the jet engine is removed in a more conventional manner, by removing the interface between the rib extensions 110 and the main beam 106 carrying the shackles.

Finally, it should be noted that the clevises 40, which are intended to engage with the spreader of the device for taking up thrust forces, are produced here in one piece with the main beam 106.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. An assembly for an aircraft, the assembly comprising:
an attachment pylon for an aircraft engine;
an engine attachment mounted on the attachment pylon to provide a joining between the engine and the attachment pylon,
wherein the attachment pylon comprises a primary structure, which comprises an upper spar, a lower spar, and two lateral panels together in a form of a box section, the primary structure being equipped with internal transverse stiffening ribs, and
wherein the engine attachment comprises a body located outside the primary structure; and
shackles that are articulated on the body and can be articulated on the engine,
wherein at least a part of the body of the engine attachment is formed in a single piece with one of the internal transverse stiffening ribs of the primary structure.

2. The assembly according to claim 1, wherein the part of the body of the engine attachment comprises a central beam located outside the primary structure,
the body further comprising, at each end of the central beam in a transverse direction of the assembly, a one-piece fitting comprising a first joining portion on which one of the shackles can be articulated and a second joining portion that is fixed to the primary structure and passes into the primary structure.

3. The assembly according to claim 2, wherein the second joining portion is arranged between one of the two lateral panels of the primary structure and a corresponding one of the internal transverse stiffening ribs of the primary structure.

4. The assembly according to claim 2, wherein the first joining portion is in a form of a clevis and the second joining portion is substantially flat.

5. The assembly according to claim 2, wherein the two one-piece fittings are fixed to the central beam, on which one or more of the shackles can be articulated.

6. The assembly according to claim 2, further comprising a device for taking up thrust forces, the device comprising:
 a support element fixed to an outside of the primary structure;
 two lateral link rods configured to take up thrust forces; and
 a spreader articulated on the support element,
 wherein the two lateral link rods are articulated on two opposite ends of the spreader, respectively, and
 wherein the two ends of the spreader are flexibly mounted on connecting members that are an integral part of the central beam.

7. The assembly according to claim 6, wherein the support element is arranged in a recess of the central beam.

8. The assembly according to claim 1, wherein the part of the body of the engine attachment is in a form of two extensions of a base of the internal transverse stiffening rib and is located outside the primary structure, the two extensions being spaced apart from one another in a transverse direction of the assembly, and the body of the engine attachment further comprises a main beam fixed to the two extensions, the shackles being articulated on the central beam.

9. The assembly according to claim 8, further comprising a device for taking up thrust forces, the device comprising:
 a support element fixed to an outside of the primary structure;
 two lateral link rods configured to take up thrust forces; and
 a spreader articulated on the support element,
 wherein the two lateral link rods are articulated on two opposite ends of the spreader, respectively, and
 wherein two ends of the spreader are flexibly mounted on connecting members that are an integral part of the main beam.

10. The assembly according to claim 9, wherein the support element is arranged between the two extensions of the base of the internal transverse stiffening rib.

11. The assembly according to claim 1, further comprising a device for taking up thrust forces, the device comprising:
 a support element fixed to an outside of the primary structure;
 two lateral link rods configured to take up thrust forces; and
 a spreader articulated on the support element,
 wherein the two lateral link rods are articulated on two opposite ends of the spreader, respectively.

12. The assembly according to claim 1, wherein the engine attachment is a rear engine attachment and the assembly further comprises a front engine attachment.

13. The assembly according to claim 12, further comprising a device for taking up thrust forces, the device comprising:
 a support element fixed to an outside of the primary structure;
 two lateral link rods configured to take up thrust forces; and
 a spreader articulated on the support element,
 wherein the two lateral link rods are articulated on two opposite ends of the spreader, respectively, and
 wherein the rear engine attachment, the front engine attachment, and the device for taking up thrust forces comprise a structure for attaching an engine that comprises an isostatic system for taking up forces.

14. The assembly according to claim 1, wherein the engine attachment comprises first and second lateral half-attachments, wherein the first half-attachment is designed to only take up thrust forces oriented in a vertical direction of the assembly and the second half-attachment is designed to only take up thrust forces oriented in the vertical direction of the assembly and in a transverse direction of the assembly.

15. An aircraft part comprising an assembly according to claim 1, a wing element from which the attachment pylon is suspended, and an engine fixed to the engine attachment.

16. An aircraft comprising at least one assembly according to claim 1.

17. A method for removing an engine fixed by an engine attachment assembly, the method comprising:
 providing an engine attachment assembly comprising:
  an attachment pylon for an aircraft engine,
  an engine attachment mounted on the attachment pylon to provide a joining between the engine and the attachment pylon,
   wherein the attachment pylon comprises a primary structure, which comprises an upper spar, a lower spar, and two lateral panels together in a form of a box section, the primary structure being equipped with internal transverse stiffening ribs, and
   wherein the engine attachment comprises a body located outside the primary structure, and
  shackles that are articulated on the body and are configured to be articulated on the engine,
  wherein at least a part of the body of the engine attachment is formed in a single piece with one of the internal transverse stiffening ribs of the primary structure, and
  wherein the shackles have at least two ends; and
 removing each of the shackles at at least one of the two ends thereof.

* * * * *